United States Patent
Fukuchi

[19]
[11] Patent Number: 6,048,827
[45] Date of Patent: Apr. 11, 2000

[54] LUBRICANT OF MAGNETIC RECORDING MEDIA, MAGNETIC RECORDING MEDIA, AND A MAGNETIC RECORDING DEVICE

[75] Inventor: Takashi Fukuchi, Tokyo, Japan

[73] Assignee: NEC Corporation, Tokyo, Japan

[21] Appl. No.: 09/203,290

[22] Filed: Dec. 1, 1998

[30] Foreign Application Priority Data

Dec. 1, 1997 [JP] Japan .................................... 9-330498

[51] Int. Cl.$^7$ .......................... C10M 111/04; G11B 5/72
[52] U.S. Cl. ................... 508/582; 508/268; 508/302; 508/550; 508/557; 427/128; 428/694 BP; 428/694 BF; 428/695; 428/900
[58] Field of Search ............................................. 508/582

[56] References Cited

U.S. PATENT DOCUMENTS

| | | | |
|---|---|---|---|
| 4,404,247 | 9/1983 | Dominguez-Burguette et al. | 428/213 |
| 4,526,833 | 7/1985 | Burguette et al. | 428/336 |
| 5,154,845 | 10/1992 | Williams | 252/54 |
| 5,741,577 | 4/1998 | Yamamoto et al. | 428/212 |
| 5,908,817 | 6/1999 | Perettie et al. | 508/422 |

FOREIGN PATENT DOCUMENTS 58-41426  3/1983  Japan .

OTHER PUBLICATIONS

Japanese Office Action and Search Report dated Mar. 2, 1999 and partial translation thereof.

Primary Examiner—Ellen M. McAvoy
Attorney, Agent, or Firm—McGinn & Gibb, P.C.

[57] ABSTRACT

In lubricant (5) of a magnetic recording medium made of conventional perfluoropolyether, one or more conductive high molecular compound is mixed. The conductive lubricant (5) prevents electric charge generated by frictional electricity from staying on the medium surface, and effectively prolongs the head-life by suppressing the break of the head element because of electric discharge between the disk medium and the head element. By employing the conductive lubricant, magnetic recording media and magnetic recording devices which are more reliable and durable can be realized.

17 Claims, 1 Drawing Sheet

5 : LUBRICANT FILM
4 : PROTECTION LAYER
3 : MAGNETIC LAYER
2 : BASE LAYER
1 : SUPPORTING MATERIAL

LUBRICANT OF MAGNETIC RECORDING MEDIA, MAGNETIC RECORDING MEDIA, AND A MAGNETIC RECORDING DEVICE

BACKGROUND OF THE INVENTION

The present invention relates to lubricant of magnetic recording medium comprising perfluoropolyether, magnetic recording medium wherein the lubricant is employed and a magnetic recording device wherein the magnetic recording medium is applied.

Along with intense requirement of miniaturization and capacity enlargement of hard disk devices, high-density recording is earnestly pursued recently. In the head-disk system, the high-density recording is attained by shortening the distance between the magnetic head and the disk medium and by heightening the rotation speed of the disk medium.

However, the short distance and the high-speed rotation increase probability of high-speed contact of a slider mounting the magnetic head with the disk medium, and hence, various obstacles caused by frictional electricity charged in lubricant of the disk medium have become important problems. The most serious among them is a break of the head element caused by electric discharge generated between charged disk medium and the magnetic head.

This problem rarely occurs in a head-disk system wherein fly-up distance of the slider is sufficiently large or a conductive material such as aluminum is used as the substrate of the disk medium. However, it occurs frequently when the fly-up distance is small and a nonconductive substrate such as a glass substrate is used, and it becomes an important and inevitable problem in a contact type head-disk system wherein the slider does not fly.

As to the disk medium having aluminum substrate, sure grounding of the aluminum substrate is usually arranged so as to generate no potential difference between the disk medium and the head element for preventing electric discharge between them. Since depth of the lubricant film or the protection film on the disk surface is sufficiently thin, electric charge generated on the lubricant film can be conducted to the ground through the substrate and causes no potential difference between the lubricant film and the head element, even though the lubricant film or the protection film is not conductive.

However, in the disk medium having a glass substrate, for example, the electric charge generated on the disk surface remains there being unable to flow through the glass substrate.

When a certain conductive material can be applied to the lubricant for conducting the generated electric charge to the ground, the above problem should be effectively resolved, but such conductive lubricant does not seem to have been disclosed until now.

SUMMARY OF THE INVENTION

Therefore, a primary object of the present invention is to provide conductive lubricant used for magnetic recording media in a magnetic disk device of a flying type or a contact type, which can prevent break of the head element coming from electric discharge, even when nonconductive substrate, such as a glass material, is used for the disk media.

In order to achieve the object, lubricant of a magnetic recording medium according to the invention is made of perfluoropolyether and includes at least one conductive high molecular compound, a magnetic recording medium according to the invention has a lubricant film made of perfluoropolyether formed on a surface of the recording medium and including at least one conductive high molecular compound, and a magnetic recording device according to the invention comprises a magnetic recording medium having a lubricant film made of perfluoropolyether formed on a surface of the recording medium and including at least one conductive high molecular compound.

The conductive lubricant prevents electric charge generated by frictional electricity from staying on the medium surface, and effectively prolongs the head-life by suppressing the break of the head element because of electric discharge between the disk medium and the head element. And therefore, by employing the conductive lubricant, magnetic recording media and magnetic recording devices which are more reliable and durable can be realized.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Figure 1:
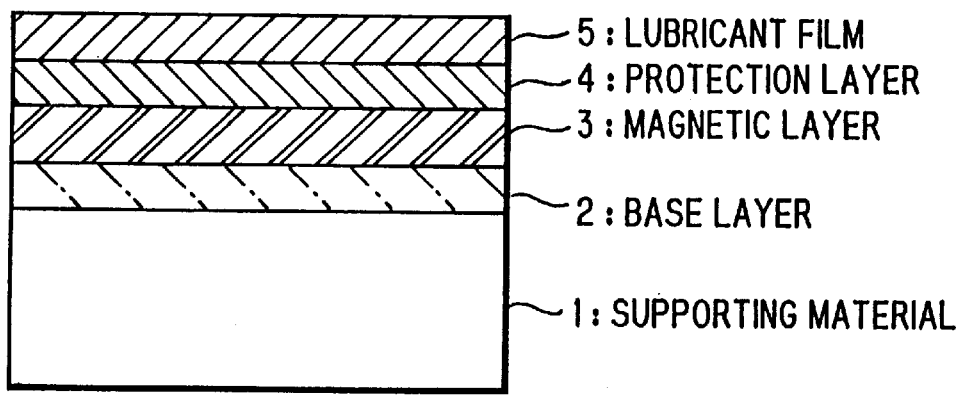
FIG. 1 is a schematic diagram illustrating a sectional view of a configuration example of a magnetic recording medium.

Now, embodiments of the present invention will be described.

The conductive lubricant should have lubrication performance substantially the same with conventional lubricant used for disk media, and at the same time, sufficient conductivity for conducting the generated electric charge to the ground so as not to remain on the medium surface.

For obtaining such performance, a conductive material is mixed in conventional lubricant made of perfluoropolyether, in conductive lubricant according to the invention. More detailed, 0.1 to 99.9 weight-percent of at least one high molecular compound having higher conductivity than the perfluoropolyether is included in lubricant comprising perfluoropolyether.

As to the perfluoropolyether, polymers having a main-chain-structure represented by one of following general formulas are widely used for conventional lubricant;

$$G-CF_2-(O-CF_2-CF_2)_p-(O-CF_2)_q-O-CF_2-G,$$

$$F-(CF_2-CF_2-CF_2)_n-CF_2-CF_2-G, \text{ and}$$

$$CF_3-(O-CF-(CF_3)-CF_2)_m-(O-CF_2)_l-G.$$

Here, p, q, n, m and l denote positive integers, respectively, and G denotes a functional end group, whereof examples are —CH$_2$OH, —OH, —CH$_2$COOH, —COOH, —C$_6$H$_5$, or a condensed ring group.

The same perfluoropolyether as used for the conventional lubricant may be used for a base material of the conductive lubricant of the invention, although the main-chain-structure thereof is not limited in the above examples. Molecular weight thereof is nor limited, although dominant molecular weight is preferable to be 1000 to 4000.

As to the conductive material to be added to the perfluoropolyether, at least one of compounds each having a structure represented one of following three general formulas [1] to [3] is employed.

1). General formula [1]

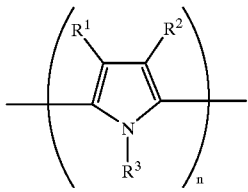

Here, each of $R^1$ and $R^2$ denotes one of a hydrogen atom, a hydroxyl group, a halogen atom, a sulfonic acid group, a carboxylic acid group, a nitro group, an amino group, an alkyl group, and an aryl group. One or both of the alkyl group and the aryl group may comprise one or more substituents, and several or all hydrogen atoms thereof may be replaced with halogen atoms. $R^3$ denotes either one of an alkyl group and an aryl group whereof either or both may comprise one or more substituents, and several or all hydrogen atoms thereof may be replaced with halogen atoms.

2). General Formula [2]

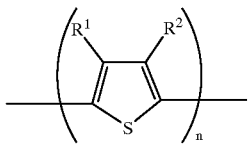

Here, each of $R^1$ and $R^2$ denotes one of a hydrogen atom, a hydroxyl group, a halogen atom, a sulfonic acid group, a carboxylic acid group, a nitro group, an amino group, an alkyl group, and an aryl group. One or both of the alkyl group and the aryl group may comprise one or more substituents, and several or all hydrogen atoms thereof may be replaced with halogen atoms.

3). General formula [3]

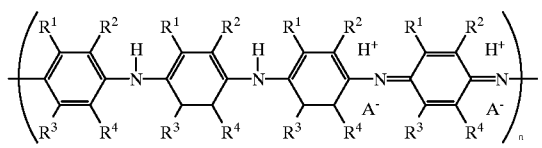

Here, each of $R^1$, $R^2$, $R^3$ and $R^4$ denotes one of a hydrogen atom, a hydroxyl group, a halogen atom, a sulfonic acid group, a carboxylic acid group, a nitro group, an amino group, an alkyl group, and an aryl group. One or both of the alkyl group and the aryl group may comprise one or more substituent, and several or all hydrogen atoms thereof may be replaced with halogen atoms. $H^+$ and $A^-$ denote a proton of protonic acid and a conjugate base thereof, the protonic acid being one or mixture of sulfonic acid, carboxylic acid, hydrofluoric acid, hydrochloric acid, hydrobronic acid, hydriodic acid, nitric acid, nitrous acid, sulfuric acid, and sulfurous acid. Molecular percentage of the protonic acid to nitrogen atoms may be 0.1 to 100.

Followings are examples of the alkyl group or the aryl group comprised in the general formulas [1] to [3];

—$CH_3$, —$CH_2$—$CH_3$, —$(CH_2)_5$—$CH_3$, —$(CH_2)_{10}$—$CH_3$, —$(CH_2)_{20}$—$CH_3$,

—$(CH_2)_{29}$—$CH_3$, —$(CH_2)_3$=$C(CH_3)$—$CH_2$—$CH_3$,

—$(CH_2)_5$—$C(CH$=$CH_2)_2$—$CH_2$—$CH_3$,

—$(CH_2)_6$—$C(CH_2$—$CH_2$—$CH_3)_2$—$(CH_2)_3$—$CH(CH_2$—$CH_2$—$CH_2$—$CH_3)$—$CH_2$—$CH_3$,

—$CF_2$—$CF_3$, —$(CF_2)_{10}$—$CH_3$, —$(CF_2)_3$—$C(CH_3)$=$CF$—$CF_3$,

—$(CF_2)_{26}$—$C(CF_3)_2$—$CF_3$,

—$C_6$—$H_5$, —$C_6H_4(CH_3)$, —$C_{10}H_7$, —$C_{10}H_5(CH_2$—$CH_3)_2$,

—$C_{14}H_9$—$C_{14}H_6(CH_3)(CH$=$CH_2)(CH_2$—$CH_2$—$CH_3)$, —$C_{30}H_{17}$, —$C_6F_5$,

—$C_{10}F_5(CH_2$—$CH_3)_2$, —$C_{10}F_5$(—$CF_2$—$CF_3)_2$, or —$C_{30}F_{17}$.

However, the alkyl group or the aryl group is not limited in the above examples, in the invention. Examples of the substituent which may be comprised in the alkyl group or the aryl group are an alkyl group, an aryl group, a heterocycle group, —F, —Cl, —Br, —I, —OH, —CO, —SH, —$SCH_3$, —$NH_2$, —$N(CH_3)_2$, —NO, —$NO_2$, —NOH, —CHO, —COOH, —$COOCH_3$, —CN, —SO, —$PH_2$, —$P(CH_3)_2$, or —$CH_2OCH_3$. However, the substituent which may be comprised in the alkyl group or the aryl group is not limited in these examples.

The conductive lubricant according to the invention is made of perfluoropolyether as beforehand described, and at least one of high molecular compounds each having a structure represented one of the above three general formulas [1] to [3] is mixed therein at a weight-percent of 0.1 to 99.9.

A magnetic recording medium according to the invention has a lubricant film made of the above conductive lubricant, which is formed on a medium surface thereof, directly on a magnetic film thereof or on a protection film thereof, for conducting electric charge to the ground so as not to remain on the medium surface even when high-speed contacts of a head slider to the medium surface may occur frequently.

FIG. 1 is a schematic diagram illustrating a sectional view of a configuration example of the magnetic recording medium according to the invention, wherein a magnetic layer 3 is formed on a supporting material 1 inserting a base layer 2, whereon a lubricant film 5 made of the conductive lubricant is formed inserting a protection layer 4. The base layer 2 and the protection layer 4 may be omitted.

The conductive lubricant of the present invention is applicable to a magnetic recording medium which is contacting or possible to contact with a magnetic head or a head slider, such as a hard disk medium, a floppy disk medium or a magnetic tape.

Any material may be used for the supporting material 1, on condition it is paramagnetic, whereof aluminum, glass, plastic, carbon, and silicon are examples preferable to a hard disk medium, and compound resin such as polyacetate is preferable to a floppy disk medium or a magnetic tape.

When the base layer 2 is provided between the supporting material 1 and the magnetic layer 3, any appropriate material such as Cr or Ni—P may be used.

As to the magnetic layer 3, there may be applied any appropriate film forming method, such as painting, coating, evaporation, sputtering, or CVD (Chemical Vapor Disposition), and any appropriate material, such as Fe, Co or Ni metal or its oxide, Co—Ni, Co—Pt, Fe—Ni, Fe—Co—Ni, Co—Cr—Pt—Ta, etc., of any appropriate thickness.

The lubricant film 5 may be formed in the same way with a conventional lubricant film, such as by a dip method or a rotary film-forming method in the case of a hard disk medium. An appropriate thickness of the lubricant film 4 is from 1 to 1000 Å, and more preferably from 5 to 100 Å.

Figure 2:
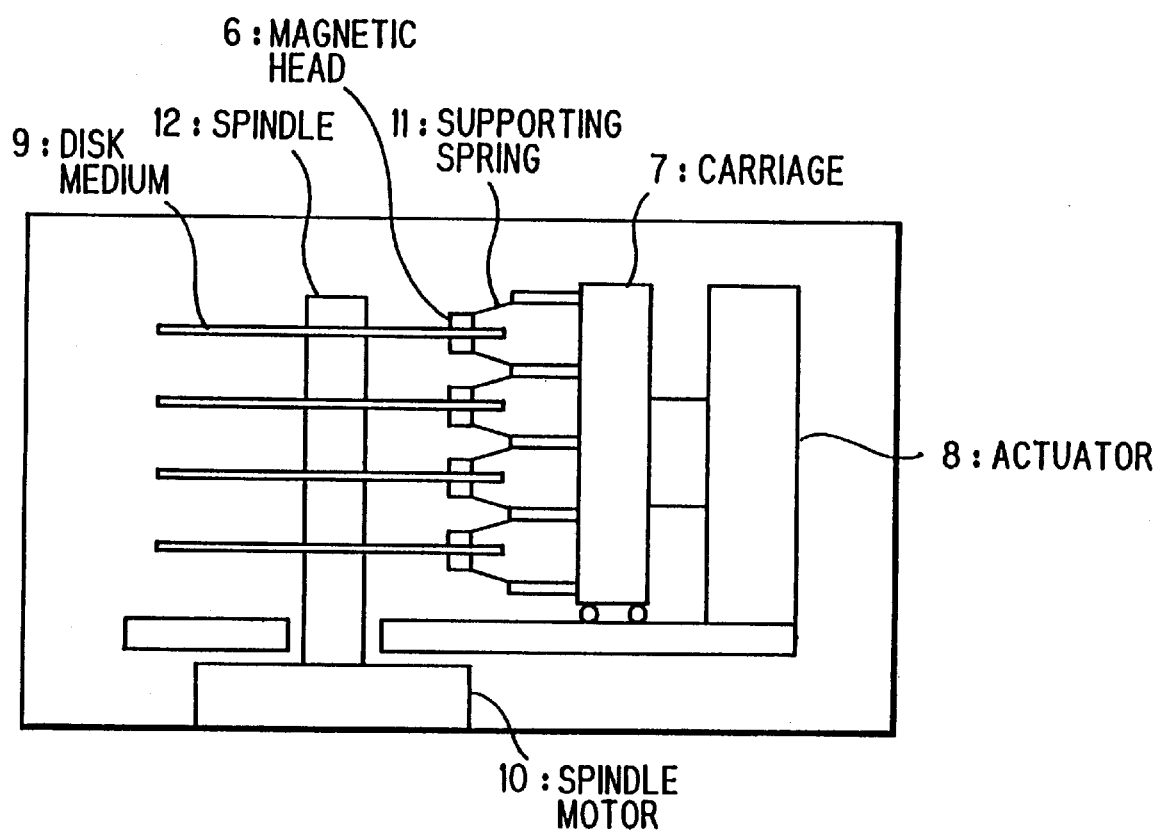
FIG. 2 is a side view schematically illustrating a configuration example of a magnetic recording device.

FIG. 2 is a side view schematically illustrating a configuration example of a magnetic recording device according to the invention, comprising a disk medium 9 whereto the the recording medium of FIG. 1 is employed, a magnetic head 6 for reading or writing information relatively sliding on a medium surface of the disk medium 9, a supporting spring 11 whereby the magnetic head 6 is pressed on the medium surface, a carriage 7 whereto the supporting spring 11 is fixed, an actuator 8 for driving the carriage 7 and a spindle 12 whereto the recording medium 9 is fixed and a spindle motor 10 for rotating the spindle 12.

In the example of FIG. 2, four disk media are set with the same intervals, films of the conductive lubricant of the invention being formed on both surfaces thereof, and eight magnetic heads are provided each facing to one of eight surfaces of the four disk media, in the same way with a conventional magnetic disk device except for the conductive lubricant film, detailed description being omitted.

Now, some concrete examples of the conductive lubricant according to the invention will be described together with their comparison to a reference example of the conventional lubricant.

The examples according to the invention and the reference example are applied to hard disk media having the same configuration as illustrated in FIG. 1. As the supporting material 1, a glass substrate having a radius of 2.5" is used, and a surface thereof is so ground that surface roughness becomes within 2 nm. Forming a CrMo film as the base layer 2 on the glass substrate, the magnetic layer 3 of CoCrPt is configured on the base layer 2, and an amorphous carbon film of 5 nm is sputtered thereon as the protection layer 5.

On surfaces of each of the hard disk media thus prepared, the lubrication film 5 is formed making use of each example of the conductive lubricant and the conventional lubricant.

In the following paragraphs, conductive high molecular compounds having structures represented by the general formula [1], [2] and [3] are abbreviated as the CHMC.

A first to a seventh example of the conductive lubricant are prepared by adding the CHMC according to the general formula [1], wherein $R^1$, $R^2$ and $R^3$ are all —$(CF_2)_5$—$CF_3$, into perfluoropolyether, as follows.

The CHMC of 1 g, for example, is dissolved into methylene chloride of 10 ml, which is added and well mixed into Fomblin Z-DOL (a trademark of MONTEFLUOS Co.) of 10 g, and processed for 30 minutes under low-pressure evaporation for eliminating the methylene chloride. The conductive lubricant thus prepared is dissolved into Fluorinert FC-77 (a trademark of SUMITOMO-3M Co.) for preparing 0.08% solution. Then, the lubricant film 5 of FIG. 1 is formed on the protection layer 5 by an ordinary dip method making use of the 0.08% solution. Thus, a conductive lubricant film of CHMC density of 10%, in the example, is prepared.

In the same way, each of the first to the seventh example having CHMC density of 0.01%, 0.5%, 1.0%, 5%, 10.0%, 50.0% and 99.9%, and a reference example having no CHMC (0.0%) is prepared by varying relative quantity of the CHMC.

With the first to the seventh example, a drag test is performed, wherein a magnetic head is slid on a disk surface being pressed onto the disk surface, and a time length until output of the magnetic head is diminished into a half is measured.

More exactly, a disk medium having the lubricant film 5 formed of one of the first to the seventh example or the reference example is set to the spindle 12 of FIG. 2, the supporting spring 11 is arranged to press a slider having the magnetic head 6 with a fixed load (500 mg) onto the surface of the recording medium 9, the actuator 8 is fixed so that the carriage 7 may not be shifted in a radius direction of the recording medium 9, and the spindle motor 10 is maintained to rotate 3600 rpm so that the slider is dragged with a relative speed of 5 m/s on the disk surface. As to the slider, a slider made of $Al_2O_3$-TiC is used without any protection film.

Results of the drag test are shown in Table 1.

TABLE 1

CHMC Density and Head-Life

| Example | Density (%) | Head-Life (H) |
|---------|-------------|---------------|
| #1 | 0.1 | 100 |
| #2 | 0.5 | 200 |
| #3 | 1.0 | >1000 |
| #4 | 5.0 | >1000 |
| #5 | 10.0 | >1000 |
| #6 | 50.0 | >1000 |
| #7 | 99.9 | >1000 |
| Ref. | 0.0 | 50 |

As shown in Table 1, the head-life, that is, the time length until output of the magnetic head is diminished into a half is effectively prolonged with the conductive lubricant of CHMC density of 0.1% to 99.9%, compared to the reference example of CHMC density of 0.0%.

Table 2 shows results of another drag test concerning a eighth to 17-th example of the conductive lubricant according to the invention, wherein the CHMC density is fixed to be 10% and a variety of subtituents are introduced in $R^1$, $R^2$ and $R^3$ of the CHMC according to the general formula [1] as listed in each row of Table 2, other factors being the same with the drag test of Table 1.

TABLE 2

CHMC Substituent and Head-Life

| Example | $R^1$ $R^2$ | $R^3$ | Head-Life (H) |
|---------|-------------|-------|---------------|
| #8 | —$(CF_2)_5$—$CF_3$<br>—$(CF_2)_5$—$CF_3$ | —$(CF_2)_5$—$CF_3$ | >1000 |
| #9 | —$(CF_2)_{10}$—$CF_3$<br>—$(CF_2)_{10}$—$CF_3$ | —$(CF_2)_{10}$—$CF_3$ | >1000 |
| #10 | —$(CF_2)_{19}$—$CF_3$<br>—$(CF_2)_{19}$—$CF_3$ | —$(CF_2)_{19}$—$CF_3$ | >1000 |
| #11 | —$(CF_2)_5$—$CF_3$<br>—$(CF_2)_{10}$—$CF_3$ | —$(CF_2)_{19}$—$CF_3$ | >1000 |
| #12 | —$(CF_2)_5$—$C(CF_3)_3$<br>—$(CF_2)_5$—$C(CF_3)_3$ | —$(CF_2)_5$—$C(CF_3)_3$ | >1000 |
| #13 | —$(CF_2)_{10}$—$C(CF_3)_3$<br>—$(CF_2)_{10}$—$C(CF_3)_3$ | —$(CF_2)_{10}$—$C(CF_3)_3$ | >1000 |
| #14 | —$(CF_2)_{19}$—$C(CF_3)_3$<br>—$(CF_2)_{19}$—$C(CF_3)_3$ | —$(CF_2)_{10}$—$C(CF_3)_3$ | >1000 |
| #15 | —$(CF_2)_5$—$C(CF_2CF_3)_3$<br>—$(CF_2)_5$—$C(CF_2CF_3)_3$ | —$(CF_2)_5$—$C(CF_2CF_3)_3$ | >1000 |
| #16 | —$(CF_2)_{10}$—$C(CF_2CF_3)_3$<br>—$(CF_2)_{10}$—$C(CF_2CF_3)_3$ | —$(CF_2)_{10}$—$C(CF_2CF_3)_3$ | >1000 |
| #17 | —$(CF_2)_{19}$—$C(CF_2CF_3)_3$<br>—$(CF_2)_{19}$—$C(CF_2CF_3)_3$ | —$(CF_2)_{19}$—$C(CF_2CF_3)_3$ | >1000 |
| Ref. | —<br>— | — | 50 |

From Table 2, it can be understood that the conductive lubricant wherein the CHMC according to the general formula [1] is added to the perfluoropolyether can effectively prolong the head-life, regardless of the substituent in the allyl group or the aryl group of the CHMC.

Table 3 shows results of another drag test performed concerning a 18-th to 27-th example of the conductive lubricant according to the invention. In the 18-th to the 27-th example, 10% of the CHMC according to the general formula [2], with $R^1$ and $R^2$ of $-(CF_2)_5-CF_3$, wherein a variety of substituents are introduced as listed in each row of Table 3, is added to the perfluoropolyether in the same way with the first to the eighth example, other factors being the same with the drag test of Table 1.

TABLE 3

CHMC of General Formula [2] and Head-Life

| Example | $R^1$ | $R^2$ | Head-Life (H) |
|---|---|---|---|
| #18 | $-(CF_2)_5-CF_3$ | $-(CF_2)_5-CF_3$ | >1000 |
| #19 | $-(CF_2)_{10}-CF_3$ | $-(CF_2)_{10}-CF_3$ | >1000 |
| #20 | $-(CF_2)_{19}-CF_3$ | $-(CF_2)_{19}-CF_3$ | >1000 |
| #21 | $-(CF_2)_5-CF_3$ | $-(CF_2)_{10}-CF_3$ | >1000 |
| #22 | $-(CF_2)_5-C(CF_3)_3$ | $-(CF_2)_5-C(CF_3)_3$ | >1000 |
| #23 | $-(CF_2)_{10}-C(CF_3)_3$ | $-(CF_2)_{10}-C(CF_3)_3$ | >1000 |
| #24 | $-(CF_2)_{19}-C(CF_3)_3$ | $-(CF_2)_{19}-C(CF_3)_3$ | >1000 |
| #25 | $-(CF_2)_5-C(CF_2CF_3)_3$ | $-(CF_2)_5-C(CF_2CF_3)_3$ | >1000 |
| #26 | $-(CF_2)_{10}-C(CF_2CF_3)_3$ | $-(CF_2)_{10}-C(CF_2CF_3)_3$ | >1000 |
| #27 | $-(CF_2)_{19}-C(CF_2CF_3)_3$ | $-(CF_2)_{19}-C(CF_2CF_3)_3$ | >1000 |
| Ref. | — | — | 50 |

From Table 3, it can be understood that the conductive lubricant wherein the CHMC according to the general formula [2] is added to the perfluoropolyether can also effectively prolong the head-life, in the same way with the CHMC according to the general formula [1].

Table 4 shows results of still another drag test performed concerning a 28-th to 37-th example of the conductive lubricant according to the invention. In the 28-th to the 37-th example, 10% of the CHMC according to the general formula [3], with $R^1$, $R^2$, $R^3$ and $R^4$ of $-(CF_2)_5-CF_3$ wherein a variety of substituents are introduced as listed in each row of Table 4, is added to the perfluoropolyether in the same way with the first to the eighth example, other factors being the same with the drag test of Table 1.

TABLE 4

CHMC of General Formula [3] and Head-Life

| Example | $R^1$ $R^2$ | $R^3$ $R^4$ | Head-Life (H) |
|---|---|---|---|
| #28 | $-(CF_2)_5-CF_3$ $-(CF_2)_5-CF_3$ | $-(CF_2)_5-CF_3$ $-(CF_2)_5-CF_3$ | >1000 |
| #29 | $-(CF_2)_{10}-CF_3$ $-(CF_2)_{10}-CF_3$ | $-(CF_2)_{10}-CF_3$ $-(CF_2)_{10}-CF_3$ | >1000 |
| #30 | $-(CF_2)_{19}-CF_3$ $-(CF_2)_{19}-CF_3$ | $-(CF_2)_{19}-CF_3$ $-(CF_2)_{19}-CF_3$ | >1000 |
| #31 | $-(CF_2)_5-CF_3$ $-(CF_2)_{10}-CF_3$ | $-(CF_2)_{19}-CF_3$ $-(CF_2)_{19}-CF_3$ | >1000 |
| #32 | $-(CF_2)_5-C(CF_3)_3$ $-(CF_2)_5-C(CF_3)_3$ | $-(CF_2)_5-C(CF_3)_3$ $-(CF_2)_5-C(CF_3)_3$ | >1000 |
| #33 | $-(CF_2)_{10}-C(CF_3)_3$ $-(CF_2)_{10}-C(CF_3)_3$ | $-(CF_2)_{10}-C(CF_3)_3$ $-(CF_2)_{10}-C(CF_3)_3$ | >1000 |
| #34 | $-(CF_2)_{19}-C(CF_3)_3$ $-(CF_2)_{19}-C(CF_3)_3$ | $-(CF_2)_{19}-C(CF_3)_3$ $-(CF_2)_{19}-C(CF_3)_3$ | >1000 |
| #35 | $-(CF_2)_5-C(CF_2CF_3)_3$ $-(CF_2)_5-C(CF_2CF_3)_3$ | $-(CF_2)_5-C(CF_2CF_3)_3$ $-(CF_2)_5-C(CF_2CF_3)_3$ | >1000 |
| #36 | $-(CF_2)_{10}-C(CF_2CF_3)_3$ $-(CF_2)_{10}-C(CF_2CF_3)_3$ | $-(CF_2)_{10}-C(CF_2CF_3)_3$ $-(CF_2)_{10}-C(CF_2CF_3)_3$ | >1000 |
| #37 | $-(CF_2)_{19}-C(CF_2CF_3)_3$ $-(CF_2)_{19}-C(CF_2CF_3)_3$ | $-(CF_2)_{19}-C(CF_2CF_3)_3$ $-(CF_2)_{19}-C(CF_2CF_3)_3$ | >1000 |
| Ref. | — — | — — | 50 |

From Table 4, it can be understood that the conductive lubricant wherein the CHMC according to the general formula [3] is added to the perfluoropolyether can also effectively prolong the head-life, in the same way with the CHMC according to the general formula [1].

As heretofore described, the conductive lubricant according to the invention prevents electric charge generated by frictional electricity from staying on the medium surface, and effectively prolongs the head-life by suppressing the break of the head element because of electric discharge between the disk medium and the head element. And therefore, by employing the conductive lubricant, magnetic recording media and magnetic recording devices which are more reliable and durable can be realized according to the invention.

What is claimed is:

1. Lubricant of a magnetic recording medium, the lubricant comprising:

a mixture of perfluoropolyether and at least one conductive molecular compound, wherein a volume-percentage of the at least one conductive molecular compound in the lubricant is from 0.1 to 99.9.

2. Lubricant as recited in claim 1; wherein a structure of the at least one conductive molecular compound is represented by a general formula;

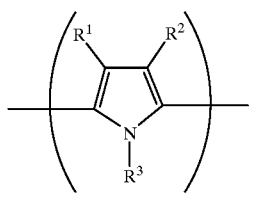

wherein each of $R^1$ and $R^2$ denotes one of a hydrogen atom, a hydroxyl group, a halogen atom, a sulfonic acid group, a carboxylic acid group, a nitro group, an amino group, an alkyl group, and an aryl group, and $R^3$ denotes either one of an alkyl group and an aryl group.

3. Lubricant as recited in claim 2; wherein any of the alkyl group and the aryl group denoted by any of $R^1$, $R^2$ and $R^3$ comprises one or more substituents.

4. Lubricant as recited in claim 2; wherein any of hydrogen atoms of only of the alkyl group and the aryl group denoted by any of $R^1$, $R^2$ and $R^3$ is replaced with a halogen atom.

5. Lubricant as recited in claim 1; wherein a structure of the at least one conductive molecular compound is represented by a general formula;

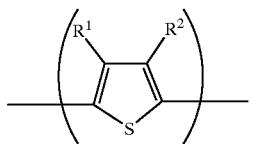

wherein each of $R^1$ and $R^2$ denotes one of a hydrogen atom, a hydroxyl group, a halogen atom, a sulfonic acid group, a carboxylic acid group, a nitro group, an amino group, an alkyl group, and an aryl group.

6. Lubricant as recited in claim 5; wherein any of the alkyl group and the aryl group denoted by any of $R^1$ and $R^2$ comprises one or more substituents.

7. Lubricant as recited in claim 5; wherein any of hydrogen atoms of any of the alkyl group and the aryl group denoted by any of $R^1$ and $R^2$ is replaced with a halogen atom.

8. Lubricant as recited in claim 1; wherein a structure of the at least one conductive molecular compound is represented by a general formula;

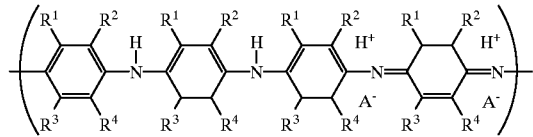

wherein each of $R^1$, $R^2$, $R^3$ and $R^4$ denotes one of a hydrogen atom, a hydroxyl group, a halogen atom, a sulfonic acid group, a carboxylic acid group, a nitro group, an amino group, an alkyl group, and an aryl group, and $H^+$ and $A^-$ denote a proton of protonic acid and a conjugate base of the proton, respectively.

9. Lubricant as recited in claim 8; wherein any of the alkyl group and the aryl group denoted by any of $R^1$, $R^2$, $R^3$ and $R^4$ comprises one or more substituents.

10. Lubricant as recited in claim 8; wherein any of hydrogen atoms of any of the alkyl group and the aryl group denoted by any of $R^1$, $R^2$, $R^3$ and $R^4$ is replaced with a halogen atom.

11. Lubricant as recited in claim 8; wherein the protonic acid includes at least one of sulfonic acid, carboxylic acid, hydrofluoric acid, hydrochloric acid, hydrobronic acid, hydriodic acid, nitric acid, nitrous acid, sulfuric acid, and sulfurous acid.

12. Lubricant as recited in claim 8; wherein a molecular percentage of the protonic acid to nitrogen atoms is from 0.1 to 100.

13. Lubricant as recited in claim 1, wherein said lubricant comprises said perfluropolyether and said at least one molecular compound mixed to form a single layer.

14. A magnetic recording medium comprising:
    a supporting material having a surface; and
    a lubricant film, the lubricant film comprising perfluoropolyether formed on the surface of the supporting material and at least one conductive molecular compound, wherein a volume-percentage of the at least one conductive molecular compound in the lubricant film is from 0.1 to 99.9.

15. The magnetic recording medium as recited in claim 14, wherein said lubricant film comprises said perfluropolyether and said at least one molecular compound mixed to form a single layer.

16. A magnetic recording device comprising:
    a magnetic recording medium having a surface; and
    a lubricant film made of perfluoropolyether and at least one conductive molecular compound, wherein a volume-percentage of the at least one conductive molecular compound in the lubricant film is from 0.1 to 99.9.

17. The magnetic recording device as recited in claim 16, wherein said lubricant film comprises said perfluoropolyether and said at least one molecular compound mixed to form a single layer.

* * * * *